United States Patent [19]

Linn et al.

[11] 3,871,500

[45] Mar. 18, 1975

[54] SELF-ADJUSTING RELEASE MECHANISM FOR FRICTION CLUTCHES

[75] Inventors: Donald F. Linn, Manlius; George L. Wishart, N. Syracuse, both of N.Y.

[73] Assignee: Lipe-Rollway Corporation, Syracuse, N.Y.

[22] Filed: Jan. 14, 1974

[21] Appl. No.: 433,248

[52] U.S. Cl. .......................................... 192/111 A
[51] Int. Cl. ........................................ F16d 13/75
[58] Field of Search ...................... 192/111 A, 70.25

[56] References Cited
UNITED STATES PATENTS

| | | | |
|---|---|---|---|
| 2,040,034 | 5/1936 | Tatter | 192/111 A |
| 2,354,829 | 8/1944 | Reed | 192/111 A |
| 3,478,853 | 11/1969 | Kraeplin | 192/111 A |

Primary Examiner—Benjamin W. Wyche
Attorney, Agent, or Firm—Bruns & Jenney

[57] ABSTRACT

A self-adjusting release mechanism for disengaging a friction clutch. As wear occurs on the clutch disc facings, repositioning of the release mechanism is required for proper operation. The mechanism includes telescoping sleeves with one sleeve carrying the release bearing and the other sleeve engaging the release levers. Associated with the inner sleeve is a wobble washer which is pushed from the perpendicular by a coil spring, thereby causing the wobble washer to releasably grip the outer sleeve. When the wear on the disc facings reaches a critical point an unlocking means acts to push the wobble washer towards the perpendicular, releasing its frictional grip on the outer sleeve. The outer sleeve, free to move axially, slides forward to a new position compensating for the wear on the discs.

4 Claims, 2 Drawing Figures

3,871,500

SELF-ADJUSTING RELEASE MECHANISM FOR FRICTION CLUTCHES

BACKGROUND OF THE INVENTION

This invention relates generally to clutch release or throw-out mechanisms, and has particular reference to a novel self-adjusting release mechanism that automatically compensates for friction disc facing wear.

In friction type clutches, the driven disc or discs are disengaged from the driving flywheel and pressure plate by actuation of the release levers which are in turn actuated by axial movement of the release mechanism. Movement of the release mechanism is normally effected by a yoke member connected through a linkage to the clutch pedal of the vehicle. In engaged condition, the clutch driving and driven members are urged into engagement by pressure springs and as wear occurs on the clutch disc facings, these springs move the pressure plate closer to the flywheel.

The inward movement of the pressure plate results in a force which tends to change the normal position of the associated release levers and release mechanism and thereby to change the adjustment required for proper operation. Thus, if the free ends of the levers and the release mechanism move inwardly with the pressure plate, this may cause binding between the release bearing and yoke member or at some other point. If, on the other hand, the release mechanism is held against inward movement, binding may occur between the lever ends and spider portion of the release mechanism.

In the past, periodic manual adjustment of the operating mechanism has been required to compensate for wear. In one type of clutch, this is accomplished by changing the angle of the yoke member. In another type, the release lever spider includes a sleeve threadedly mounted on one end of a second sleeve having the release bearing mounted on its opposite end. This permits relative axial movement between the sleeves whereby the distance between the release lever ends and yoke member can be changed to compensate for wear. A release mechanism having manual adjustment means of this last-mentioned type is disclosed in U.S. Pat. No. 2,863,537 to Root, owned by the assignee of the present invention.

The only self-adjusting clutch release mechanism known to the applicants is disclosed in U.S. Pat. No. 3,433,341 to Bohn et al. In this patent, the mechanism includes a collapsible or extendible release bearing carrier with ball bearings retained in an angled cavity of a sleeve member surrounding the carrier, permitting the assembly to controllably collapse or extend to reposition the release bearing with respect to the clutch. This mechanism is more complex than that of the present invention and appears to be considerably more expensive to manufacture.

The applicants herein have three related copending applications Ser. No. 356,723, filed May 3, 1973; Ser. No. 399,996 filed Sept. 24, 1973 and Ser. No. 419,769 filed Nov. 28, 1973 are all directed to different modifications of the self-adjusting clutch release mechanism disclosed in the present application.

SUMMARY OF THE INVENTION

The self-adjusting release mechanism disclosed herein includes a first sleeve axially slidable on the driven or output shaft of the clutch and carrying the release bearing at one end. A second sleeve is mounted for axial sliding movement adjacent the other end of the first sleeve, the second sleeve carrying lugs engageable with the ends of the release levers for actuating same. A wobble washer is mounted on the second sleeve and engaged at its outer edge by means connected to the inner sleeve. The wobble washer, kept from the perpendicular by means producing a horizontal force, frictionally grips the outer sleeve on opposite sides thereof whereby axial movement in the inner sleeve is transmitted to the outer sleeve.

When wear on the clutch disc facings reaches a particular point a release, or unlocking, element causes the wobble washer to be moved towards the perpendicular, thereby releasing its grip on the outer sleeve. The outer sleeve, free to move axially, will slide forward to compensate for the wear.

The wobble washer re-establishes its hold on the outer sleeve the next time the release mechanism is actuated and the two sleeves again act as one until a new adjustment is required.

DESCRIPTION OF THE PREFERRED EMBODIMENT

Figure 1:
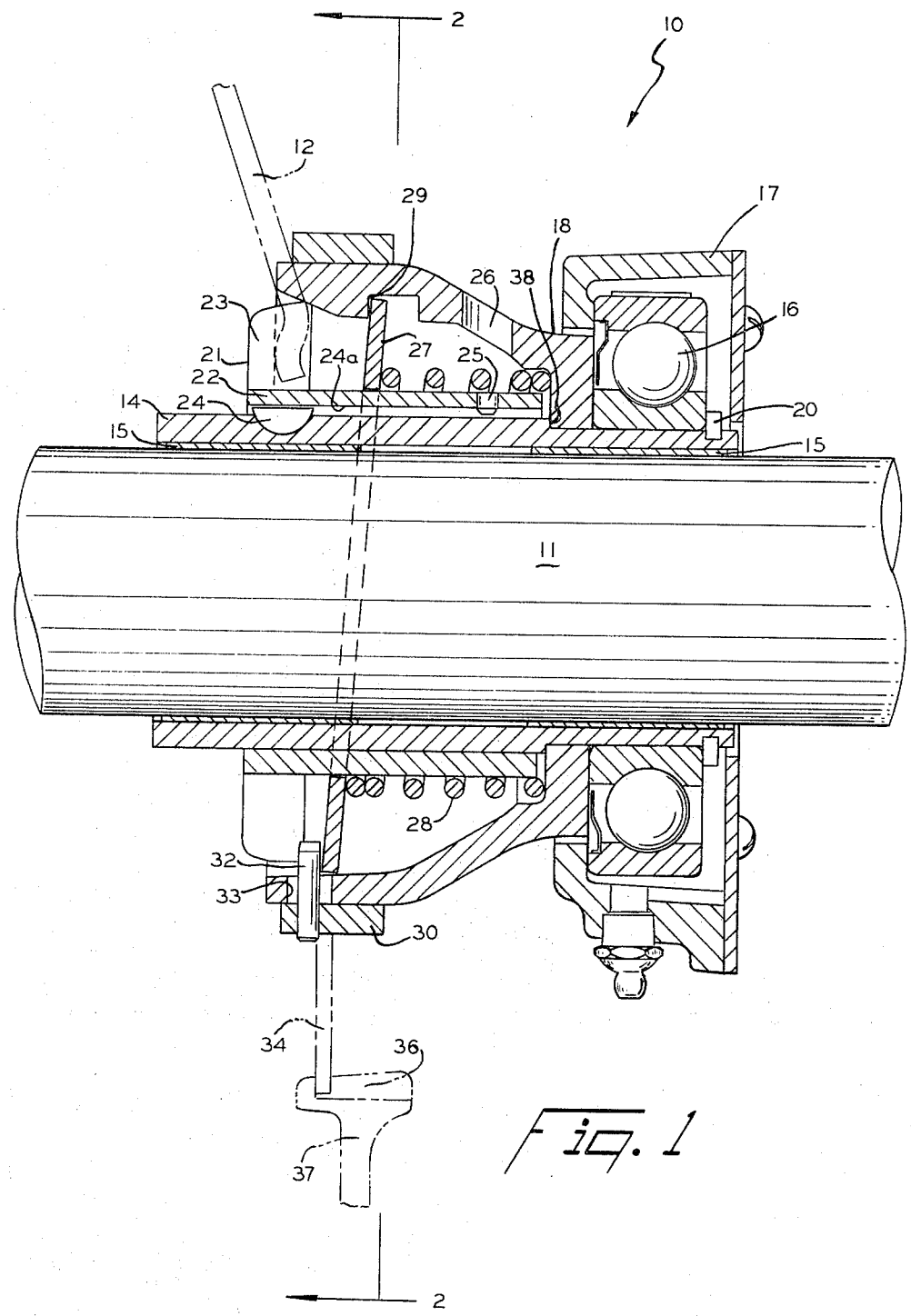
FIG. 1 is a vertical section through the clutch release mechanism of the invention taken on line 1—1 of FIG. 2.

Referring now to the drawings, the release mechanism that is shown forms a part of an otherwise conventional friction clutch such as that disclosed in Root U.S. Pat. No. 2,863,537,cited above. Accordingly, reference may be had to the Root patent for a description of the function and operation of the conventional clutch components, including the driven discs on the facings of which wear occurs.

The release mechanism, generally indicated at 10, is mounted for axial sliding movement on the driven or output shaft 11 and the inner (forward) end of the mechanism is in engagement with release levers 12 for actuation of same. The mechanism shown is for a pull type clutch meaning that it must be moved rearwardly or to the right in FIG. 1 to disengage the clutch. Such movement operates through the release levers to move the pressure plate (not shown) rearwardly and causes the driving connection between the driving and driven members to be disengaged.

Release member 10 includes a first or inner sleeve 14 separated from the driven shaft 11 by a pair of bushings 15. Mounted on the rear end of sleeve 14 is a release bearing 16 including the bearing housing 17. The inner race of the bearing is held on the sleeve by a bell member 18, to be described, on one side and a retaining ring 20 on the other side.

A release lever spider 21 is slidably mounted on sleeve 14 adjacent its forward end, the spider comprising a sleeve 22 and a plurality of circumferentially spaced U-shaped lugs 23 for receiving the inner ends of the release levers 12.

Rotational movement between the two sleeves is prevented by key 24. Set screw 25, accessible through opening 26 in bell member 18, forms a stop in the keyway 24a of sleeve 22 in the event that the latter moves axially through too great a distance. In accord with the invention, relative axial movement between the inner and outer sleeves 14, 22 is normally prevented by a wobble washer 27 mounted on sleeve 22.

A compression spring 28 encircles sleeve 22 and biases the wobble washer 27 against a locking lug 29 on bell member 18. Being pushed from the perpendicular, the washer 27 contacts the outer sleeve 22 on its upper and lower surfaces. The non-aligned vertical components of the force of the wobble washer 27 on the outer sleeve 22, being unable to rotate the sleeve out of its horizontal position, will result in a frictional binding between the washer and sleeve.

The frictional binding of the washer 27 on the outer sleeve 22 is relieved, in a manner to be presently described, by an unlocking ring 30 slidably mounted on bell member 18. The lower portion of this ring has an unlocking pin 32 projecting perpendicularly from its inner edge. This unlocking pin is dimensioned to be movable axially relative to the shaft 11 within a slot 33 in bell member 18.

Figure 2:
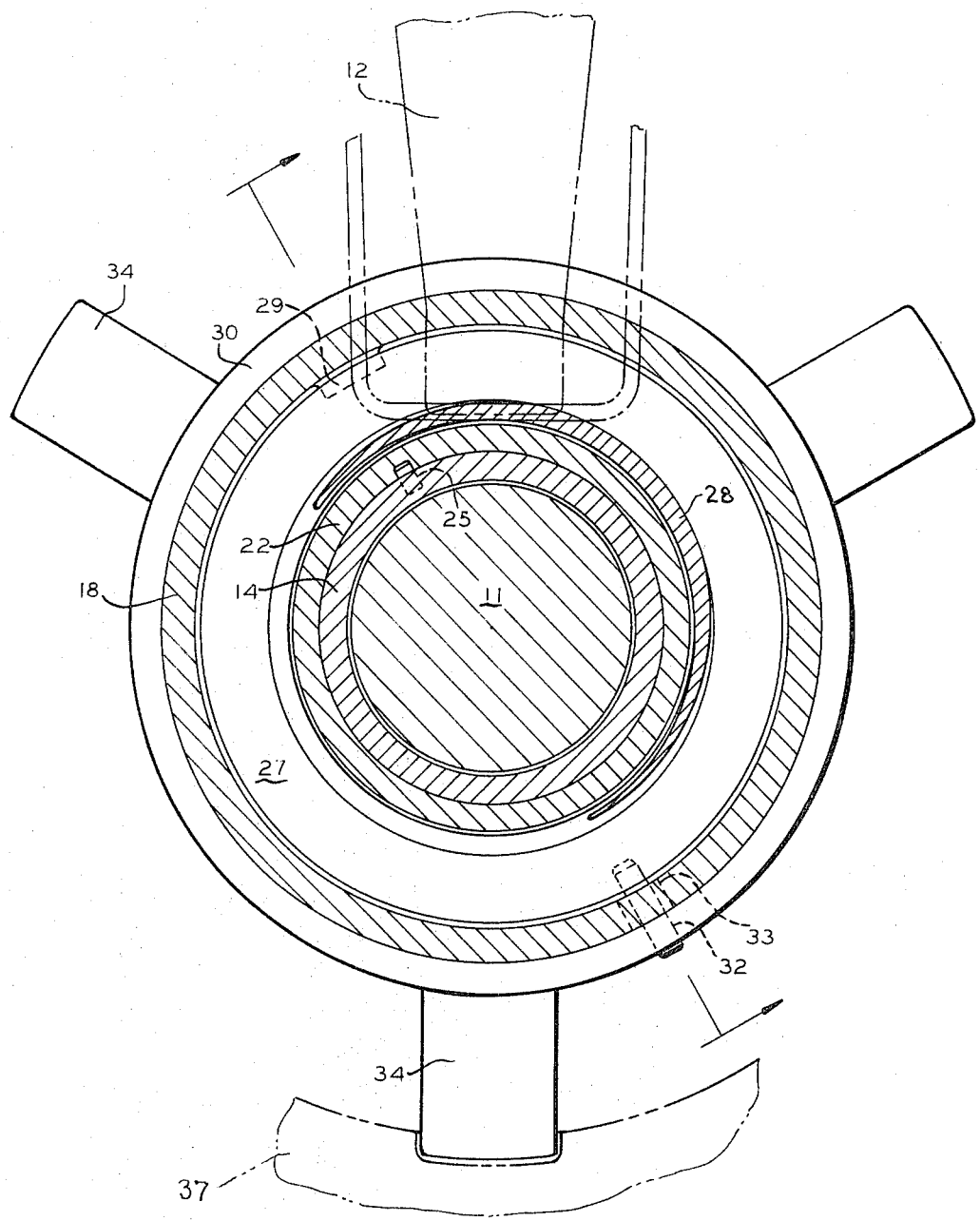
FIG. 2 is a transverse section through the mechanism taken on line 2—2 of FIG. 1.

Secured to the outer edge of the unlocking ring 30 are three circumferentially spaced arms 34, which project radially outward from the ring as best seen in FIG. 2. The outer ends of the arms are dimensioned to fit within slots 36 in the clutch cover 37, FIG. 1. These arms, free to move axially within the slots 36, are prevented from rotational movement by the side walls thereof, thereby preventing rotational movement of the unlocking ring 30. When the clutch is engaged, these arms abut the end walls of said slots and the unlocking pin 32 contacts the lower rim of wobble washer 27, FIG. 1.

In normal operation of the release mechanism, without consequential wear on the driven disc facings, disengagement of the clutch is as follows: Release mechanism 10 is moved to the right or rearwardly by a clutch pedal actuated yoke (not shown) which engages the release bearing housing 17. The yoke pull is transmitted through the release bearing 16, retaining ring 20 and inner sleeve 14 to the bell member 18, the latter being clamped between an external annular shoulder 38 on the inner sleeve and the inner race of the bearing as shown in FIG. 1. The rearward movement of bell 18 is transmitted to wobble washer 27 at its upper edge by locking lug 29.

Because the upper part of the wobble washer is prevented from forward axial movement only by locking lug 29, the horizontal force of the compression spring will cause the washer to move from the perpendicular, and thereby contact the outer sleeve 22 on its upper and lower surfaces. The rearward pull of the bell member 18 on the non-perpendicular washer 27 will therefore result in both rearward and downward components of force on the spider 21 at the upper contact point and rearward and upward components of force on the spider at the lower contact point. Because the upper and lower contact points of the washer 27 on the spider 21 are not in vertical alignment, the vertical components of force, being unable to move the outer sleeve from the horizontal, will frictionally bind said elements. The rearward movement of the bell member 18 is transmitted to the spider by the rearward components of force which cause the release levers 12 to be actuated, thereby disengaging the clutch.

When the clutch pedal is released, the release mechanism will be returned to its starting position in the conventional manner to reengage the clutch.

When the wear on the disc facing is no longer inconsequential so that adjustment is required, the adjustment is automatically made during re-engagement of the clutch, or as the release mechanism moves forwardly (to the left in FIG. 1). As the release levers 12 reach their starting position, the arms 34 of the unlocking ring 30 contact the clutch cover 37 at the front walls of slots 36, thereby preventing further forward movement of the ring. Due to the wear, however, the pressure plate and attached release levers are able to move farther forward toward the flywheel and are strongly urged to do so by the usual pressure springs (not shown) acting on the pressure plate. This causes the free ends of the release levers 12 to continue to urge spider 21 forward, thereby moving the lower rim of the wobble washer forward, until it abuts the now stationary unlocking pin 32. As the spider continues forward the wobble washer moves to the perpendicular resulting in lessening of the vertical forces exerted on the outer sleeve by the washer. When the wear reaches the critical stage the vertical forces will have so decreased as to terminate the frictional binding between the wobble washer 27 and sleeve 22.

With said sleeves 14, 22 no longer bound together, the spider 21 can move forward to a new position dictated by the pressure plate and release levers 12. On the next rearward movement of the release mechanism to disengage the clutch, the wobble washer 27 reaffirms its hold on the spider sleeve 22. Further relative movement between sleeves 22 and 14 is therefore prevented until additional wear on the disc facing reaches the point where another adjustment is called for.

From the foregoing description it will be apparent that the invention provides a novel self-adjusting release mechanism that can effectively reduce vehicle down time and maintenance costs. As will be understood by those familiar with the art, the invention may be embodied in other specific forms without departing from the spirit or essential characteristics thereof.

We claim:

1. In a friction clutch for connecting driving and driven shafts, the clutch having means for normally effecting a driving connection between the shafts and release levers actuatable to disengage said driving connection, the improvement comprising an inner sleeve member axially slidable on the driven shaft, an outer sleeve member axially slidable on the inner sleeve member, means on one of the sleeve members engageable with the release levers for actuating same, an annular member dimensioned to loosely fit about the outer sleeve member, means operably connecting a point on the annular member with the inner sleeve, means acting on the annular member so that it is moved from the perpendicular and frictionally grips the outer sleeve member, whereby axial movement of the one sleeve member in one direction operates to correspondingly move the other sleeve member and actuate the release levers, and means to force the annular member towards the perpendicular and thereby release the grip of said member on the outer sleeve, such release means being operable when the wear on the clutch driving connection reaches a particular point to permit relative axial movement between the sleeve members to compensate for the wear.

2. A friction clutch as defined in claim 1 wherein the release means includes a bell member fixed on the inner sleeve and a second annular member slidably mounted on the bell member.

3. In a friction clutch for connecting driving and driven shafts, the clutch having means for normally effecting a driving connection between the shafts and release levers actuatable to disengage said driving connection, the improvement comprising an inner sleeve member axially slidable on the driven shaft, an outer sleeve member axially slidable on the inner sleeve member, means on the outer sleeve member engageable with the release levers for actuating same, an annular member dimensioned to loosely fit about the outer sleeve, a bell shaped member fixed to the inner sleeve, means connecting the bell member and a point on the annular member, means to apply horizontal force to said annular member forcing it from the perpendicular and thereby causing it to frictionally grip the outer sleeve on the opposite sides thereof, whereby axial movement of the one sleeve member in one direction operates to correspondingly move the other sleeve and actuate the release levers, an unlocking ring slidably mounted on the bell member, and means on the unlocking ring to force the annular member towards the perpendicular when the wear on the clutch driving connection has reached a particular point whereby said annular and outer sleeve members are freed from frictional engagement permitting relative axial movement between sleeve members to compensate for the wear.

4. A friction clutch defined in claim 3 including a clutch cover, and wherein the unlocking ring is limited in its axial movement by a member outwardly projecting from said ring and arranged to abut against the clutch cover.

* * * * *